United States Patent
Yao (10) Patent No.: US 12,066,600 B2
(45) Date of Patent: Aug. 20, 2024

(54) LENS SYSTEM INCLUDING FIVE LENSES OF -+-+- REFRACTIVE POWERS

(71) Applicant: Apple Inc., Cupertino, CA (US)

(72) Inventor: Yuhong Yao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 16/935,086

(22) Filed: Jul. 21, 2020

(65) Prior Publication Data
US 2021/0033824 A1    Feb. 4, 2021

Related U.S. Application Data

(60) Provisional application No. 62/881,831, filed on Aug. 1, 2019.

(51) Int. Cl.
| | |
|---|---|
| *G02B 13/00* | (2006.01) |
| *G02B 9/60* | (2006.01) |
| *H04N 23/698* | (2023.01) |
| *G02B 13/18* | (2006.01) |

(52) U.S. Cl.
CPC ........... *G02B 13/0045* (2013.01); *G02B 9/60* (2013.01); *G02B 13/0005* (2013.01); *H04N 23/698* (2023.01); *G02B 13/18* (2013.01)

(58) Field of Classification Search
CPC ... G02B 13/0045; G02B 9/60; G02B 13/0005
See application file for complete search history.

(56) References Cited

U.S. PATENT DOCUMENTS

| | | |
|---|---|---|
| 9,459,430 B2 | 10/2016 | Liu |
| 9,658,435 B2 | 5/2017 | Hashimoto |
| 10,191,248 B2 | 1/2019 | Hashimoto |
| 2014/0211328 A1 | 7/2014 | Hashimoto et al. |
| 2015/0098135 A1 | 4/2015 | Chung et al. |
| 2015/0098137 A1 | 4/2015 | Chung et al. |
| 2015/0103225 A1 | 4/2015 | Hsu et al. |
| 2015/0219879 A1 | 8/2015 | Zhao et al. |
| 2017/0168264 A1* | 6/2017 | Chen .................. G02B 9/60 |
| 2017/0205604 A1 | 7/2017 | Hsu et al. |

(Continued)

FOREIGN PATENT DOCUMENTS

| | | | |
|---|---|---|---|
| CN | 202256848 | 5/2012 | |
| CN | 109581624 A * | 4/2019 | ......... G02B 13/0045 |

(Continued)

OTHER PUBLICATIONS

CN-109581624-A, translation (Year: 2019).*
International Search Report and Written Opinion from PCT/US2020/044460, dated Oct. 27, 2020, pp. 1-14.

*Primary Examiner* — Wen Huang
(74) *Attorney, Agent, or Firm* — Robert C. Kowert; Kowert, Hood, Munyon, Rankin & Goetzel, P.C.

(57) ABSTRACT

A camera includes a photosensor configured to capture light projected onto a surface of the photosensor and a lens system configured to refract light from an object field located in front of the camera to form an image of a scene at an image plane at or near the surface of the photosensor. The lens system comprises a plurality of refractive lens elements arranged along an optical axis of the camera. The lens system is configured to have a field-of-view (FOV) within a range of 110° to 140°, and the lens system has an F-number within a range of 2.2 to 2.8.

19 Claims, 10 Drawing Sheets

(56) References Cited

U.S. PATENT DOCUMENTS

2018/0372995 A1* 12/2018 Tsai .................. G02B 13/18
2019/0227281 A1    7/2019 Baik et al.
2019/0271832 A1*  9/2019 Kuo .................. G02B 9/60
2020/0379217 A1* 12/2020 Huang ................ G02B 13/04
2021/0033823 A1*  2/2021 Li .................... G02B 9/60

FOREIGN PATENT DOCUMENTS

| EP | 2690480 | 1/2014 |
| WO | 2018222827 | 12/2018 |

* cited by examiner

LENS SYSTEM INCLUDING FIVE LENSES OF -+-+- REFRACTIVE POWERS

This application claims benefit of priority to U.S. Provisional Application No. 62/881,831, filed Aug. 1, 2019, titled "Lens System", which is hereby incorporated by reference in its entirety.

BACKGROUND

Technical Field

This disclosure relates generally to camera systems, and more specifically to high-resolution, small form factor camera systems and lens systems.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an imaging lens system that is capable of capturing high brightness, high resolution images under the physical constraints imposed by small form factor cameras.

SUMMARY OF EMBODIMENTS

Embodiments of the present disclosure may provide a camera having a large field-of-view (FOV) in a small package size. A camera is described that includes a photosensor and a compact lens system. Embodiments of a compact lens system with five lens elements are described that may provide a larger field-of-view (FOV) than has been realized in conventional small form factor cameras. In some embodiments, the lens system of the present disclosure may be configured to provide a FOV that is 110 degrees or greater.

In some embodiments, a camera includes a photosensor configured to capture light projected onto a surface of the photosensor and a lens system configured to refract light from an object field located in front of the camera to form an image of a scene at an image plane at or near the surface of the photosensor. The lens system comprises a plurality of refractive lens elements arranged along an optical axis of the camera. The lens system may be configured to have a field-of-view (FOV) within a range of 110° to 140° and an F-number within a range of 2.2 to 2.8.

In some embodiments, a lens system includes a plurality of refractive lens elements arranged along an optical axis of the lens system. The plurality of lens elements may include five lens elements, in order along the optical axis from an object side to an image side. A first lens element may have negative refractive power and an aspheric object side surface. A second lens element may have a positive refractive power, a convex object side surface in a paraxial region, and a convex image side surface in the paraxial region. A third lens element may have negative refractive power and have a concave image side surface in the paraxial region. A fourth lens element may have positive refractive power and have a convex image side surface in the paraxial region. A fifth lens element may have a concave image side surface in the paraxial region and may have an aspheric image side surface with at least one region being convex from the paraxial region to peripheral regions. The lens system may have a field-of-view (FOV) within a range of 110° to 140°.

In some embodiments, a device includes one or more processors, one or more cameras, and a memory comprising program instructions executable by at least one of the one or more processors to control operations of the one or more cameras. At least one of the one or more cameras is a wide field-of-view (FOV) camera having a photosensor configured to capture light projected onto a surface of the photosensor and a lens system configured to refract light from an object field located in front of the camera to form an image of a scene at an image plane at or near the surface of the photosensor. The lens system comprises five refractive lens elements arranged along an optical axis of the camera. The lens system has a field-of-view (FOV) within a range of 110° to 140° and has an F-number within a range of 2.2 to 2.8.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments described herein provide a camera and associated lens system having a wide field-of-view (FOV) lens design that may provide various advantages compared to other lens designs. For example, the lens system of the present disclosure may have a FOV that is greater than 110°, such as within a range of 110° to 140° (compared to a conventional wide FOV camera, with a 60° to 80° FOV). A conventional wide FOV camera may have numerous shortcomings in certain use cases, such as for a front-facing camera application. When a user is not centered within the narrower 60° to 80° FOV, the user's face may be clipped. By providing a wider FOV, the lens design of the present disclosure may enable tracking of a user in a much larger area, providing the advantage of a reduced likelihood of the user's face being clipped. As another advantage, the wide lens design of the present disclosure may enable multiple users' faces to be captured. Additionally, the lens system of the present disclosure may have a low F-number that is less than or equal to 2.8 (such as within a range of 2.2 to 2.8) to satisfy such use cases.

In some embodiments, the lens system may have a five refractive element design which may provide satisfactory image quality while reducing module height. In some cases, the lens system of the present disclosure may utilize a middle aperture lens design configuration for satisfactory aberration correction at the wide lens FOV.

Figure 1:
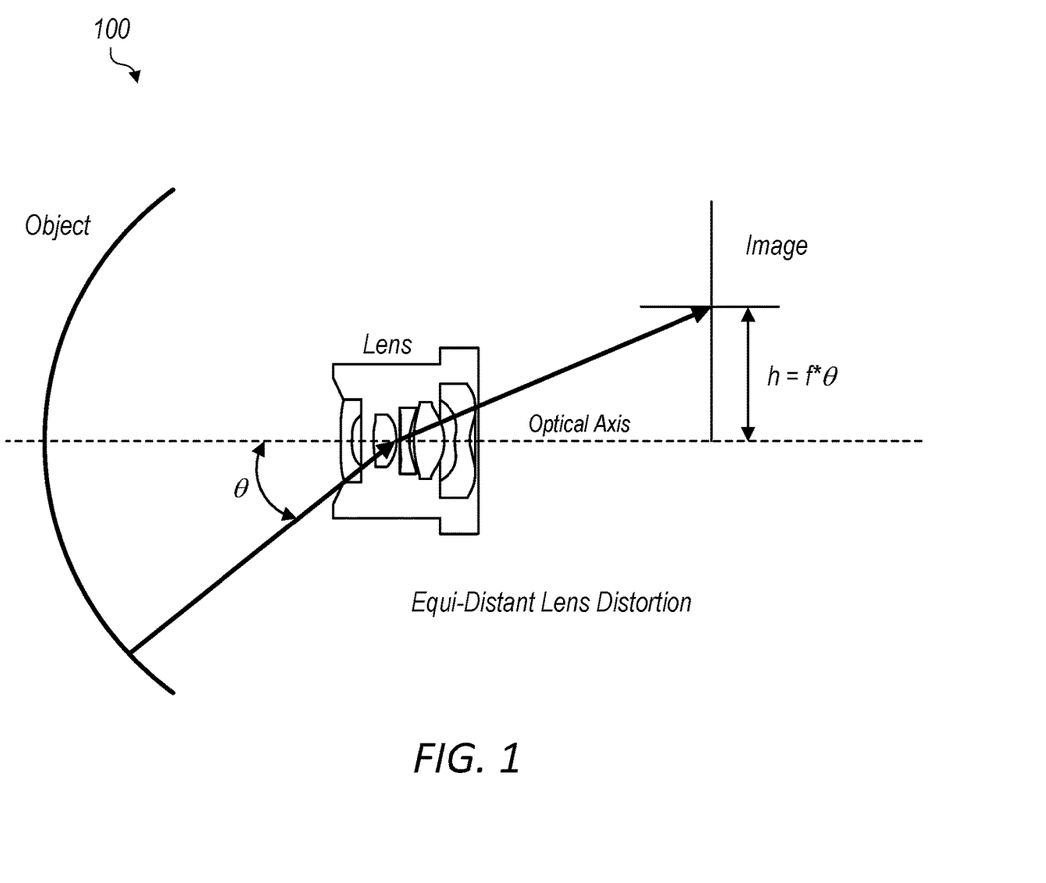
FIG. 1 is a cross-sectional illustration of a compact camera including a compact lens system that provides a wide FOV and substantially equi-distant lens distortion, according to some embodiments.

Additionally, for a conventional imaging lens for photography, rectilinear projection is typically followed to reduce distortion of the object being taken. Even for wide FOV lenses where deviation from rectilinear projection is inevitably needed at extreme FOVs, it is preferred that the rectilinear distortion is minimized. FIG. 1 illustrates that, in some alternative use cases, it may instead be preferable to provide substantially equi-distant distortion where the angular object space resolution is maintained across the field of view. Further, as the camera of the present disclosure may be utilized in a consumer electronics device (e.g., a mobile device, such as a smart phone or a tablet), both camera height and size of the system opening aperture are important for product fit. The lens design of the present disclosure actively considers such factors to provide satisfactory system fit.

FIG. 1 is a diagram illustrating a camera 100 including the lens design according to the present disclosure may provide a wide FOV and substantially equi-distant optical distortion, according to some embodiments. Further details of an example of a lens design for the camera 100 of FIG. 1 are illustrated and described herein with respect to FIGS. 2 through 5. FIGS. 2 through 5 are substantially drawn-to-scale.

A virtual entrance pupil tends to "walk-away" from an optical axis when the object-space angle of incidence is large. The virtual entrance pupil is enabled by the present wide-lens design to "walk-off" the optical axis for high angle of viewing. In other words, for the wide-lens design of the present disclosure, the position of the virtual entrance pupil is dependent on the angle of viewing and changes across the field of view of the lens. For some use cases, the angle-of-viewing dependency of the virtual entrance pupil is engineered in such a way that at any specific angle of viewing, the object-space incident rays point to a certain virtual entrance pupil location and, subsequently it gets imaged by the lens to the sensor where the equi-distant projection relationship is sustained.

FIG. 1 illustrates that the lens system of the present disclosure (see e.g., the lens system 210 of FIGS. 2-5) may provide equi-distant distortion such that an angular object space resolution is substantially maintained across the entire FOV. The lens system has an effective focal length (EFL), and Dist_Error corresponds to a deviation from a perfect equi-distant distortion. FIG. 1 illustrates that θ represents an angle-of-viewing as measured with respect to the optical axis and an object that is located along an object arc in the object field. Yreal is a first value that is dependent on the angle-of-viewing, where Yreal(θ) is defined as a real image position at which a particular angle-of-viewing is imaged onto the photosensor. Yref is a second value dependent on the angle-of-viewing and is defined as:

$$Yref(\theta) = EFL * \theta.$$

Figure 8:
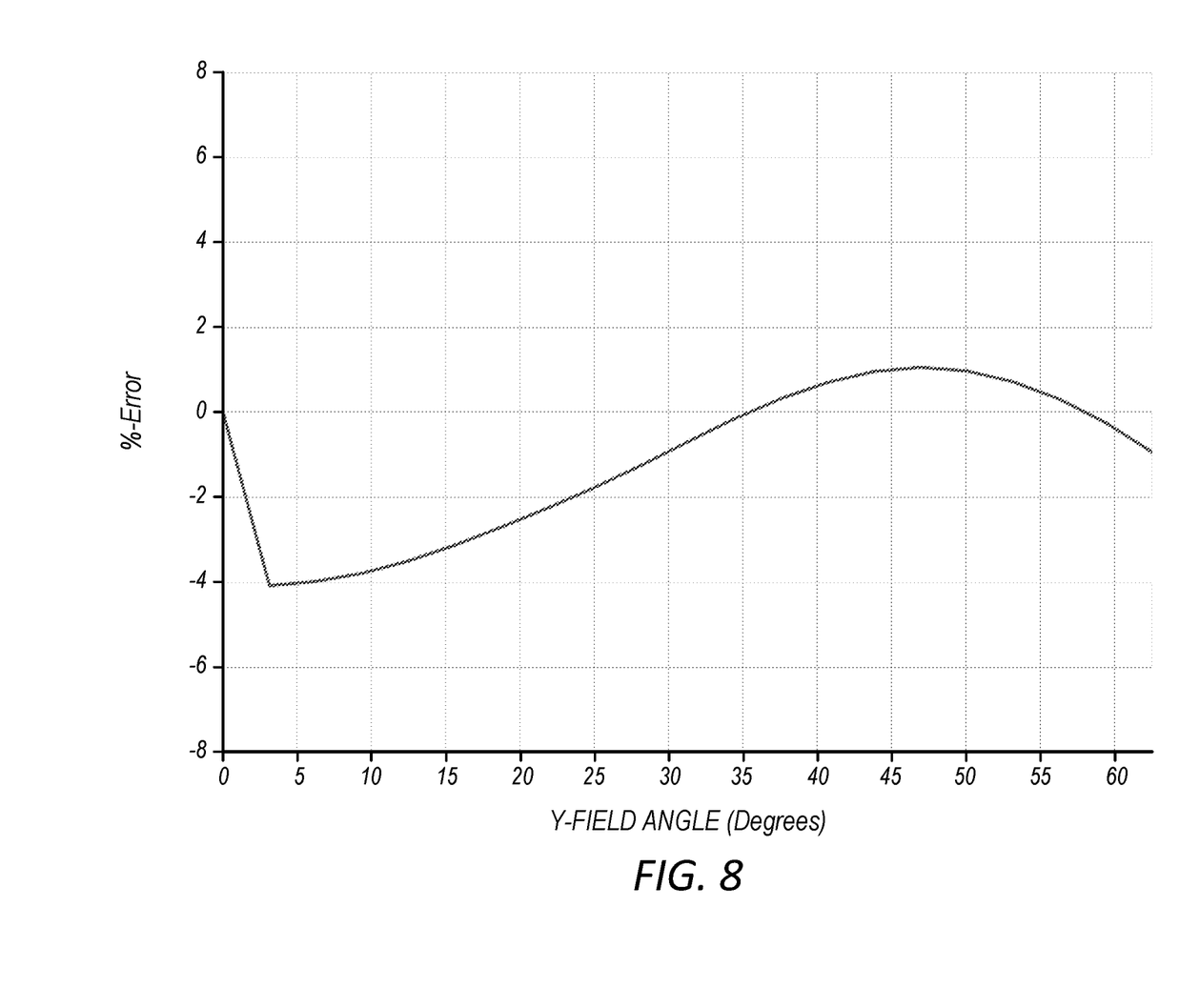
FIG. 8 is a graph illustrating a lens distortion deviation from perfect equi-distant distortion for a lens system as illustrated in FIGS. 1 through 5, for a particular embodiment of lens specifications.

Dist_Error(θ)=100×[Yreal(θ)−Yref(θ)]/Yref(θ), and the lens system of the present disclosure may have a |Dist_Error (θ)| across the entire FOV that is less than 8 percent. For example, FIG. 8 is a graph depicting an example of deviation from perfect equi-distant distortion for a particular embodiment of a lens design, as described further herein.

Figure 10:
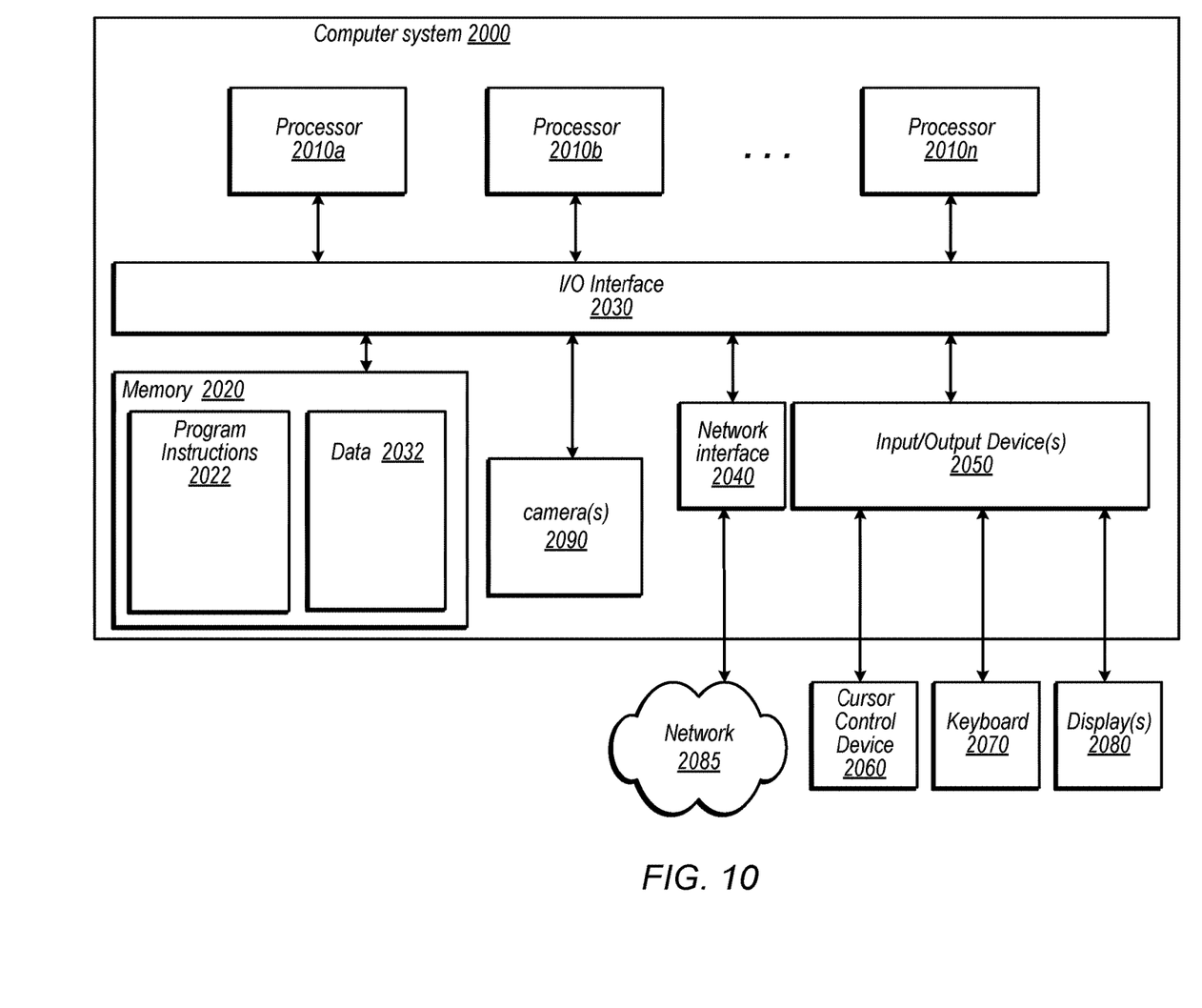
FIG. 10 illustrates an example computer system that may be used in embodiments.

Embodiments of the camera as described herein may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. FIG. 10 illustrates an example device that may include one or more small form factor cameras that use embodiments of the camera as described herein. However, note that aspects of the camera (e.g., the lens system, photosensor, etc.) may be scaled up or down to provide cameras with larger or smaller package sizes. In addition, embodiments of the camera may be implemented as stand-alone digital cameras. In addition to still (single frame capture) camera applications, embodiments of the camera may be adapted for use in video camera applications.

Figure 2:
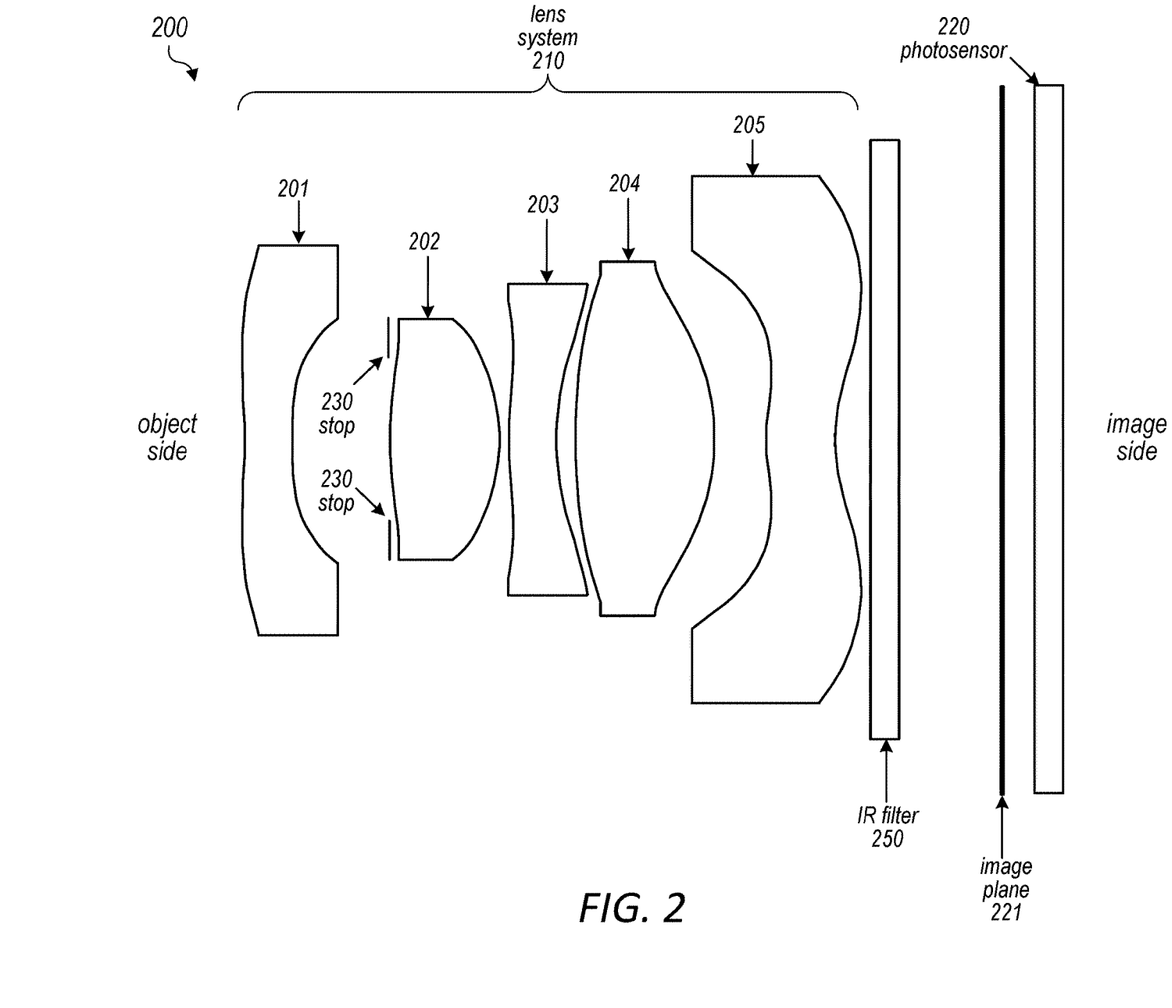
FIG. 2 is a cross-sectional illustration of selected portions of a compact camera having a compact lens system that includes five refractive elements, according to some embodiments.

FIG. 2 is a cross-sectional illustration of selected portions of an example of a camera including a lens design that may provide a wide FOV, according to some embodiments. FIG. 2 shows an example camera 200 including a lens system 210 with five refractive lens elements 201-205 to be mounted in a lens barrel (omitted in FIG. 2, see e.g., the lens barrel 112 of FIG. 1), with an aperture stop 230 located between the first (object side) lens element 201 and the second lens element 202.

The camera 200 also includes a photosensor 220, and may also include an optional infrared (IR) filter 250. A camera 200 including an embodiment of the lens system 210 as illustrated in FIG. 2 may, for example, be implemented in portable electronic devices such as mobile phones and tablets. Embodiments of the lens system 210 may provide a wide FOV (>=110°, such as in a range of 110° to 140°), a low F-number (<=2.8, such as in a range of 2.2 to 2.8), and high resolution imaging. Further, the lens system 210 may provide substantially equi-distant distortion such that an angular object space resolution is substantially maintained across the entire FOV.

As shown in the example of FIG. 2, embodiments of the lens system 210 may include five lens elements 201-205 with refractive power. Note, however, that some embodiments may include more or fewer refractive lens elements.

As illustrated in the example camera 200 of FIG. 2, the lens system 210 may include five lens elements 201-205 with refractive power, in order from the object side to the image side of the camera 200. A first lens element 201 has negative refractive power and has an aspheric object side surface. A second lens element 202 has positive refractive power, has a convex object side surface in a paraxial region, and has a convex image side surface in the paraxial region. A third lens element 203 has negative refractive power and has a concave image side surface in the paraxial region. A fourth lens element 204 has positive refractive power and has a convex image side surface in the paraxial region. A fifth lens element 205 has a concave image side surface in the paraxial region and has an aspheric image side surface with at least one region being convex from the paraxial region to peripheral regions. At least one of the refractive lens elements 201-205 may be formed of lightweight polymer or plastic material. An aperture stop 230 may be located in the lens system 210 between the first and second lens elements 201, 202 for controlling the brightness of the camera 200. Note that the power order, shape, or other optical characteristics of the refractive lens elements may be different in some embodiments, and some embodiments may include more or fewer refractive lens elements. The five refractive lens elements 201-205 stack to secure the required wide FOV and equi-distant optical distortion, while being configured properly in lens materials and power configurations for correcting aberrations.

In some embodiments, the camera 200 includes an IR filter 250, for example located between the fifth lens element 205 and photosensor 220 as depicted in FIG. 2, to reduce or eliminate interference of environmental noises on the sensor 220.

For the camera 200 depicted in FIGS. 2 through 5, the lens system 210 may have a focal length fsystem. In order to facilitate correction of aberrations across the field of view, surface shapes of certain lens elements, in addition to their power arrangement, may be configured to satisfy various criteria.

To illustrate, in some embodiments, the first lens element 201 may have a first focal length f1, satisfying the following relationship: −0.8<fsystem/f1<−0.2.

In some embodiments, the second lens element 202 may have a second focal length f2, satisfying the following relationship: 0.9<fsystem/f2<1.6.

In some embodiments, the third lens element 203 may have a third focal length f3, satisfying the following relationship: |fsystem/f3|<0.7.

In some embodiments, the fourth lens element 204 may have a fourth focal length f4, satisfying the following relationship: 0.5<fsystem/f4<1.2.

In some embodiments, the object side surface of the second lens element 202 has a radius of curvature R3, and the image side surface of the second lens element 202 has a radius of curvature R4, satisfying the relationship: |R4/R3|<0.6.

In some embodiments, an object side surface of the third lens element 203 has a radius of curvature R5, and the image side surface of the third lens element 203 has a radius of curvature R6, satisfying the following relationship:

$$|(R5+R6)/(R5-R6)|>1.5.$$

In some embodiments, an object side surface of the fourth lens element 204 has a radius of curvature R7, and the image side surface of the fourth lens element 204 has a radius of curvature R8, satisfying the following relationship: |R8/R7|<0.54.

In some embodiments, an object side surface of the fifth lens element 205 has a radius of curvature R9, and the image side surface of the fifth lens element 205 has a radius of curvature R10, satisfying the following relationship:

$$|(R9+R10)/(R9-R10)|>1.7.$$

In some embodiments, various material dispersion properties may provide satisfactory chromatic aberration correction. In a particular embodiment, the first lens element 201 may have an Abbe number Vd1 that is greater than 50; the second lens element 202 may have an Abbe number Vd2 that is greater than 50; the third lens element 203 may have an Abbe number Vd3 that is less than 30; the fourth lens element may have an Abbe number Vd4 that is greater than 50; and the fifth lens element 205 may have an Abbe number Vd5 that is less than 30.

Figure 3:
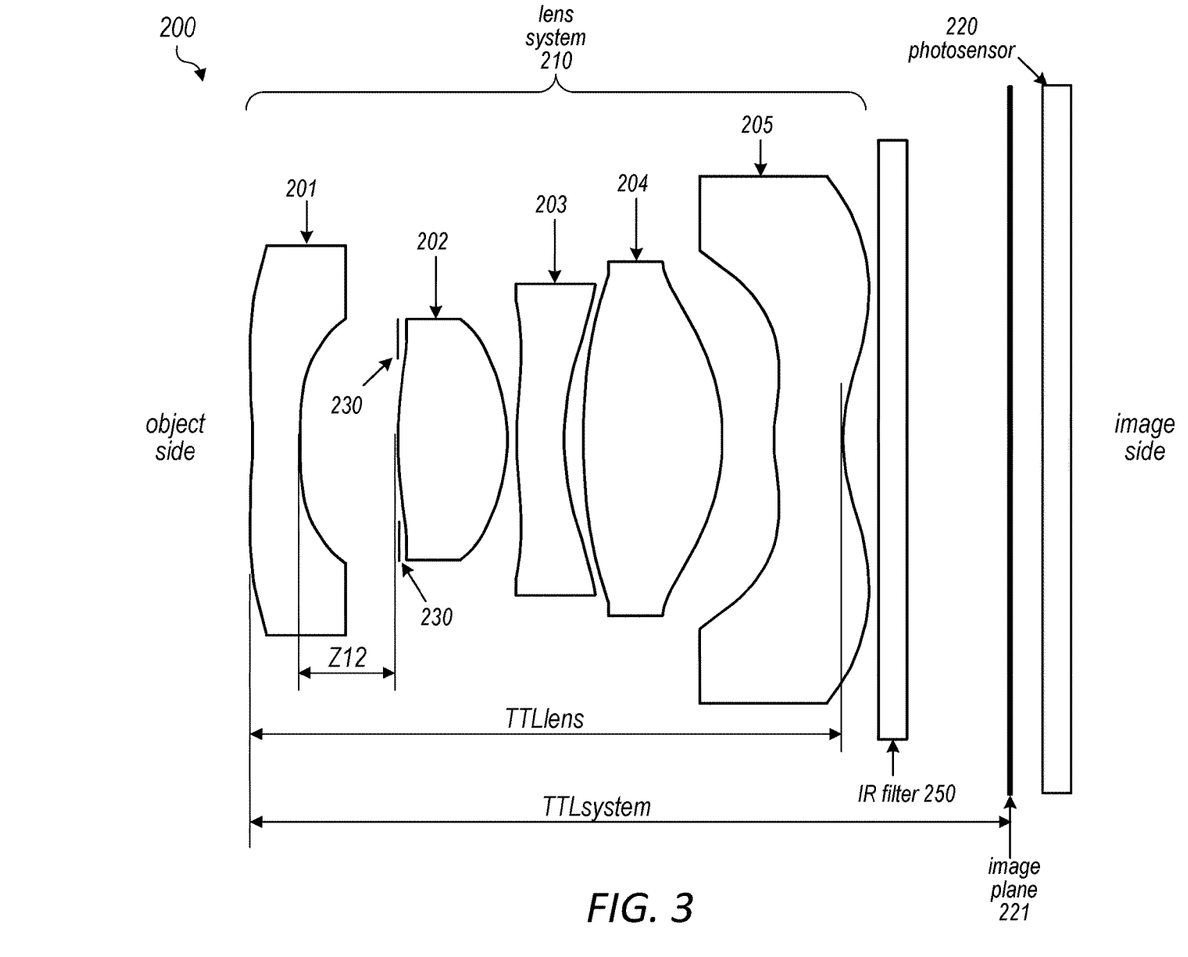
FIG. 3 illustrates selected dimensions associated with the example depicted in FIG. 2, for explanation purposes.

FIG. 3 illustrates various dimensions such that particular design criteria may be satisfied. For example, ImagH may represent a maximum image height the lens system 210 is designed for projecting the image on the photosensor 220. FIG. 3 illustrates that TTLsystem is a distance from a vertex of the object side surface of the first lens element 201 to the image plane 221. FIG. 3 further illustrates that TTLlens is a distance from the vertex of the object side surface of the first lens element 201 to a vertex of the image side surface of the fifth lens element 205. Additionally, FIG. 3 illustrates that Z12 is a distance of the vertex of the image side surface of the first lens element 201 to a vertex of the object side surface of the second lens element 202.

The lens system 210 is designed such that the following relationships are satisfied: TTLsystem/(2*ImagH)<1.2; 0.75<TTLlens/TTLsystem<0.85; 0.1<Z12/TTLlens<0.2; and TTLsystem<5 millimeters (mm).

Figure 4:
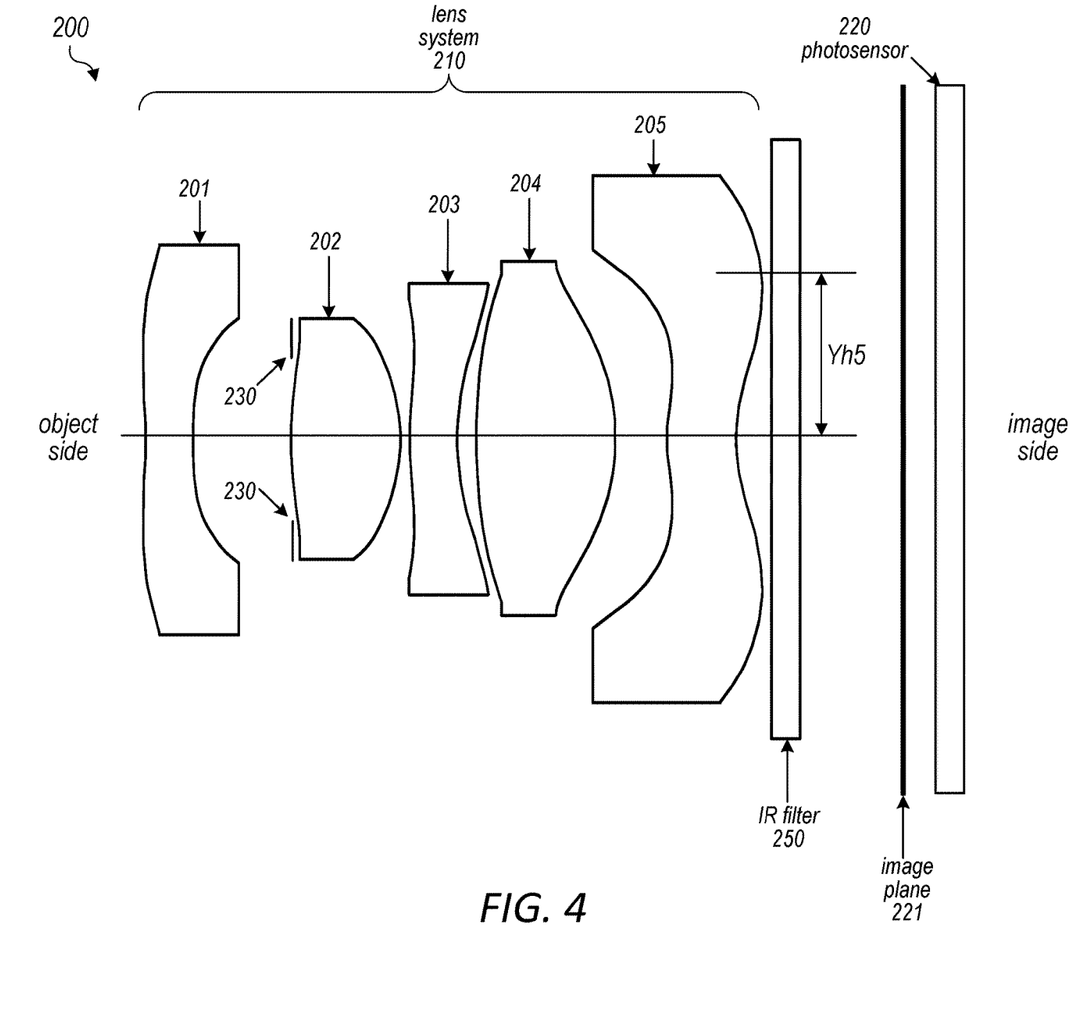
FIG. 4 illustrates selected dimensions associated with the example depicted in FIG. 2, for explanation purposes.

FIG. 4 illustrates various dimensions such that particular design criteria may be satisfied. For example, FIG. 4 illustrates that the image side surface of the fifth lens element 205 has an outermost vertex at which the image side surface of the fifth lens element 205 becomes convex. FIG. 4 further illustrates that a maximum SAG (aspheric SAG) value along the image side surface of the fifth lens element 205 has a height Yh5 measured from the optical axis to the outermost vertex. An effective focal length of the lens system 210 is EFL, and the lens system 210 is designed such that the following relationship is satisfied:

$$0.4 < Yh5/EFL < 0.7.$$

Figure 5:
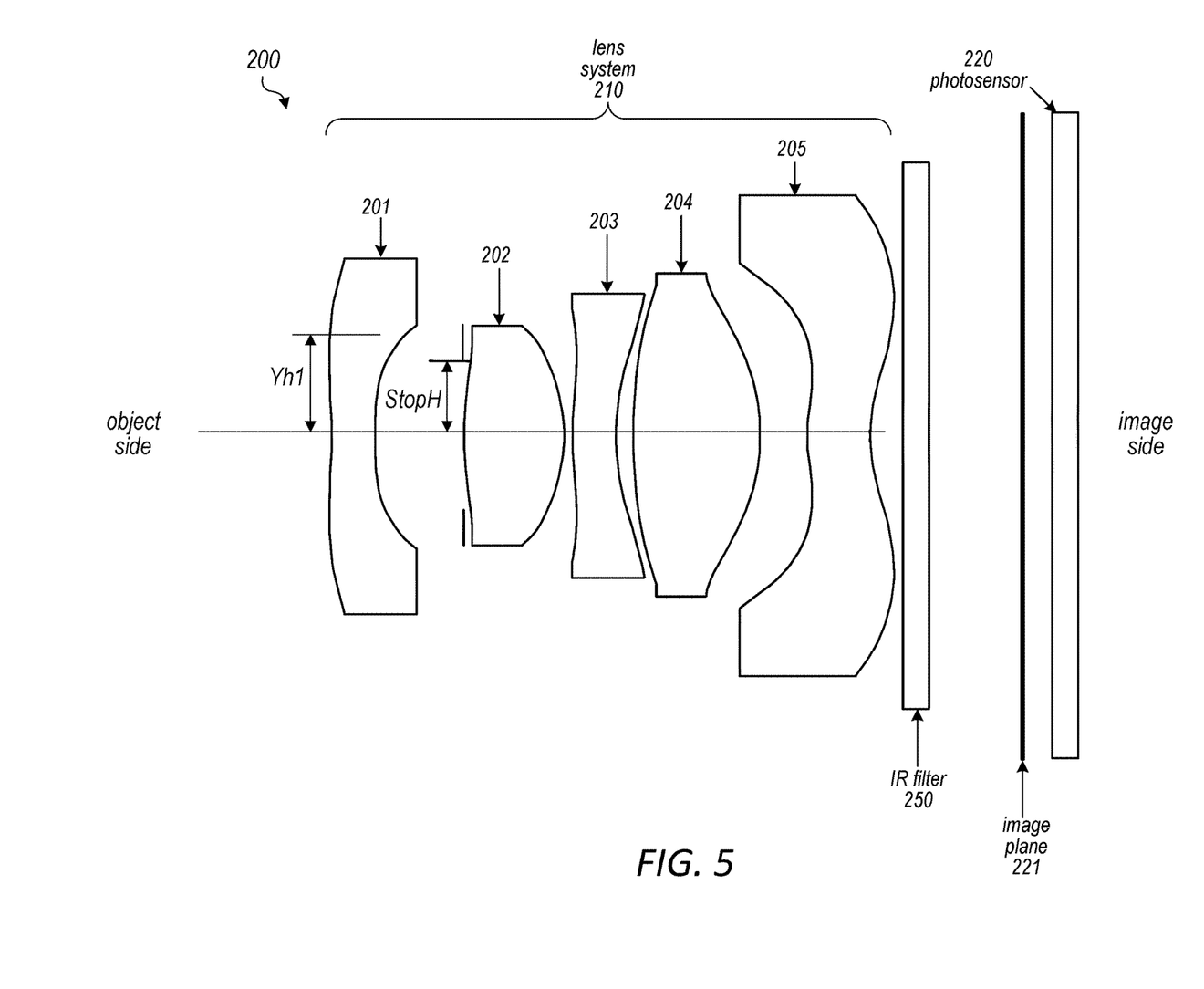
FIG. 5 illustrates selected dimensions associated with the example depicted in FIG. 2, for explanation purposes.

FIG. 5 illustrates various dimensions such that particular design criteria may be satisfied. For example, FIG. 5 illustrates that the object side surface of the first lens element 201 has at least one region that is convex. The object side surface of the first lens element 201 has an outermost vertex at which the object side surface of the first lens element 201 becomes convex. FIG. 5 illustrates that a maximum SAG value along the object side surface of the first lens element 201 has a height Yh1 measured from the optical axis to the outermost vertex. FIG. 5 further illustrates that StopH is a half-height dimension of the aperture stop 230 as measured from the optical axis to an edge of the aperture stop 230 along a Y-axis that is defined by the optical axis and the outermost vertex. CT1 is a center thickness of the first lens element 201 as measured along the optical axis from the object side of the first lens element 201 to the image side of the first lens element 201. The lens system 210 is designed such that the following relationships are satisfied: 0.2<Yh1/EFL<0.5; 0.8<Yh1/StopH<1.4; and 1.5<Yh1/CT1<4.

Figure 6:
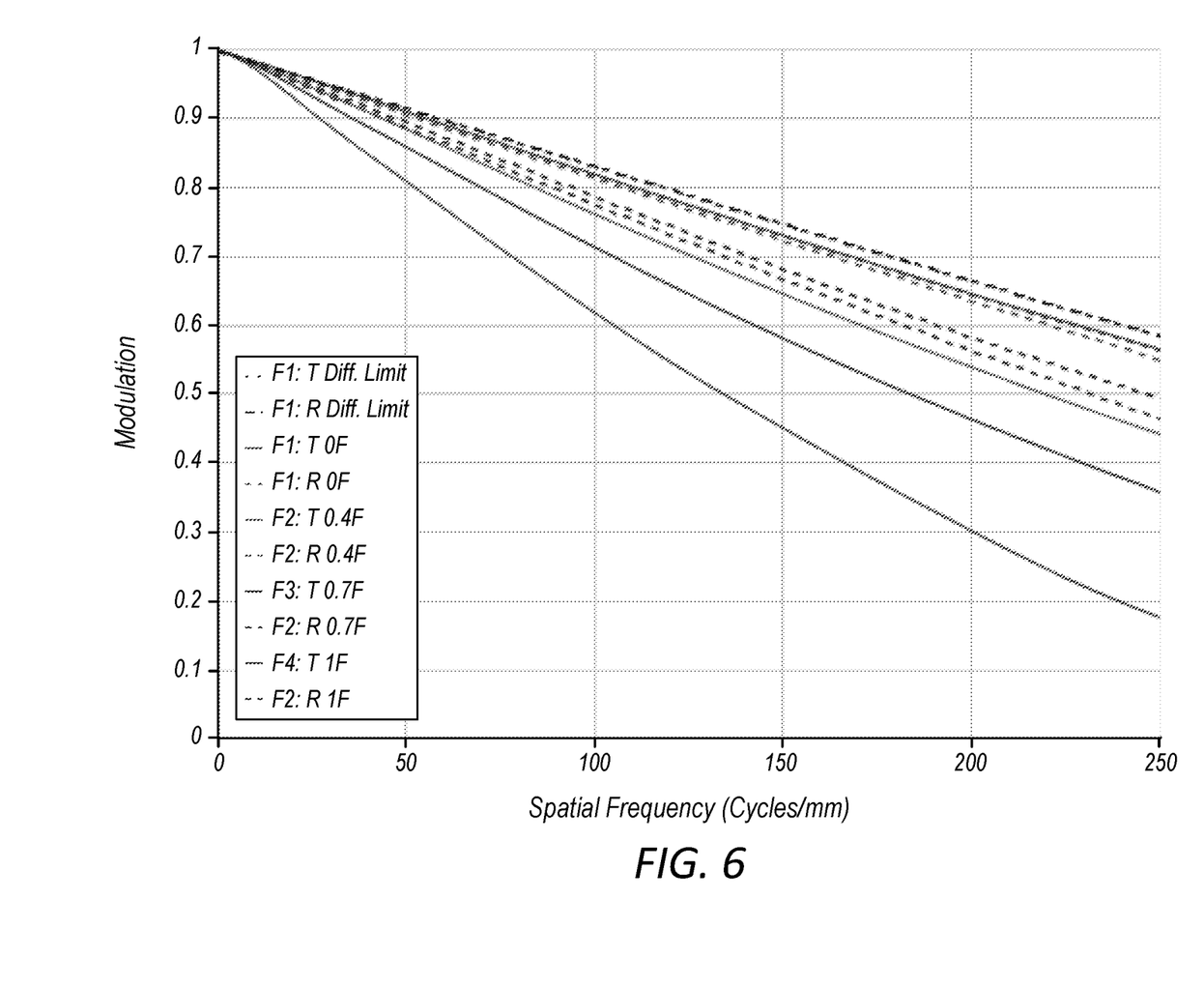
FIG. 6 is a graph illustrating a modulation transfer function (MTF) for a lens system as illustrated in FIGS. 1 through 5, for a particular embodiment of lens specifications.
Figure 7:
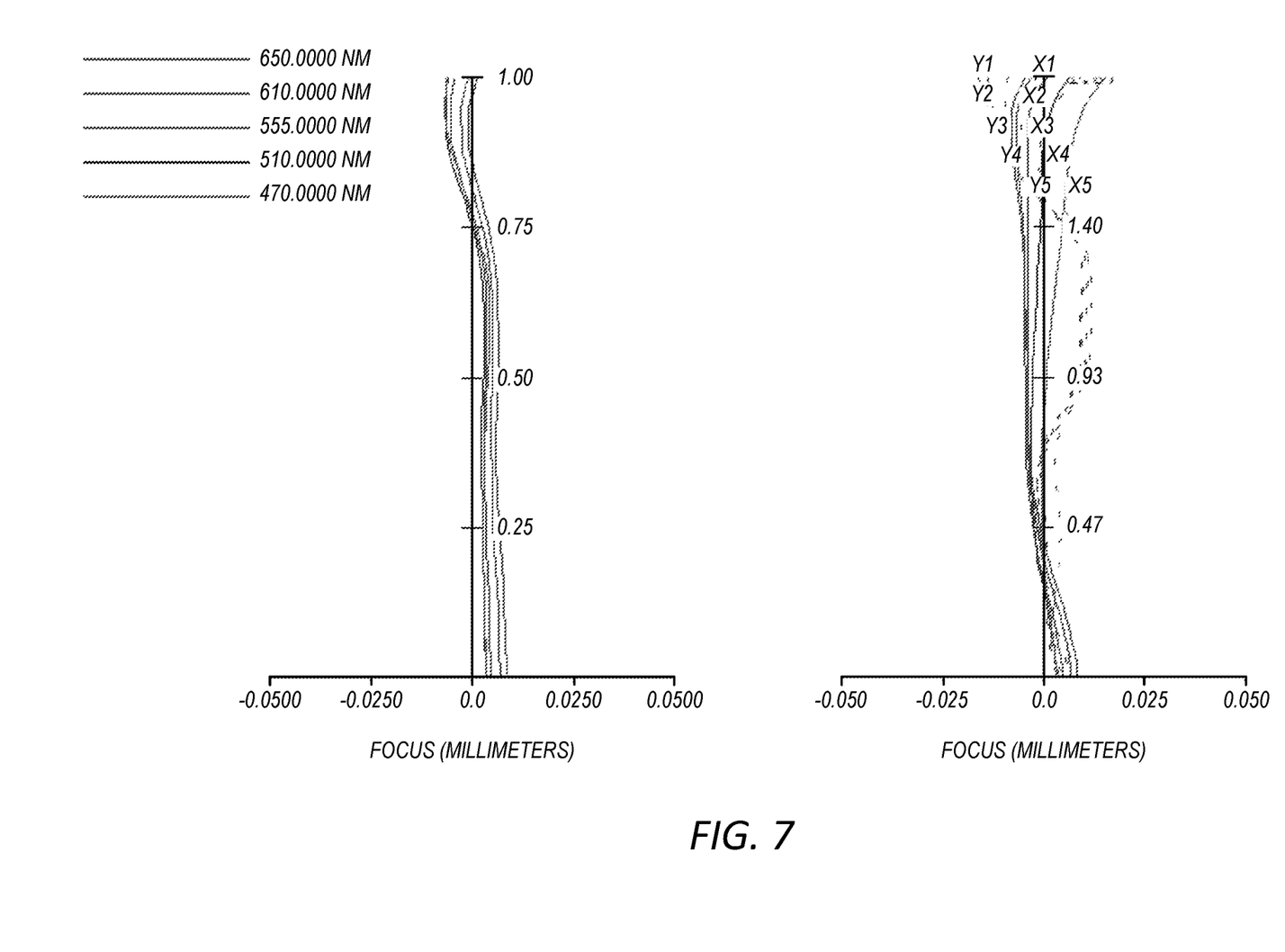
FIG. 7 shows longitudinal spherical aberration and astigmatic field curves for a lens system as illustrated in FIGS. 1 through 5, for a particular embodiment of lens specifications.

FIGS. 6 through 8 are graphs illustrating performance parameters for a particular embodiment of a lens design according to the present disclosure. Specifically, the lens specifications for the particular embodiment of the lens design include an F-value of 2.4 and a 125° full FOV (FFOV). Note that the FFOV is twice the largest incident angle in the object space, where θmax=62.5 degrees. Further, the lens specifications for the particular embodiment of the lens design include a TTLLens value of 4 mm and an ImagH value of 1.86 mm. FIGS. 6-8 illustrate that following the design methodology within the scope of the present disclosure, high image quality (MTF, see FIG. 6), well-balanced aberration control across the field of view (see FIG. 7) and small distortion error (see FIG. 8) is demonstrated.

FIG. 6 is a graph illustrating a modulation transfer function (MTF) for a lens system 210 as illustrated in FIG. 2, designed according to the aforementioned specifications. FIG. 7 shows longitudinal spherical aberration and astigmatic field curves for a lens system 210 as illustrated in FIG. 2, designed according to the aforementioned specifications.

FIG. 8 is a graph illustrating a lens distortion deviation from perfect equi-distant distortion for a lens system 210 as illustrated in FIG. 2, designed according to the aforementioned specifications. As previously described herein with respect to FIG. 1, a virtual entrance pupil tends to "walk-away" from the optical axis when the object-space angle of incidence is large. The virtual entrance pupil is enabled by the present wide-lens design to "walk-off" the optical axis for high angle of viewing. In other words, for the wide-lens design of the present disclosure, the position of the virtual entrance pupil is dependent on the angle of viewing and changes across the field of view of the lens.

A camera including the wide FOV lens design of the present disclosure may have the ability to enable capturing face(s) in a wider area compared to a conventional regular-wide FOV camera, according to some embodiments. In some embodiments, the camera of the present disclosure may be incorporated into a device (e.g., a mobile device, such as a smart phone or a tablet) as a front-facing camera.

With a conventional regular-wide FOV camera, a user has to be tightly positioned in order to not have his/her face clipped, due to the narrower FOV (e.g., in a range of 60° to 80°). By contrast, the wide-lens design of the present disclosure provides a wider FOV (e.g., >=110°, such as in a range of 110° to 140°), enabling tracking of a user in a much larger area. This may be advantageous in certain use cases, such as in a video conferencing application that utilizes a front facing camera of a device.

Additionally, in the case of multiple users, with a conventional regular-wide FOV camera, the users have to be tightly positioned in order to not have one or more of their faces clipped, due to the narrower FOV (e.g., in a range of 60° to 80°). By contrast, the wide-lens design of the present disclosure provides a wider FOV (e.g., >=110°, such as in a range of 110° to 140°), enabling tracking of multiple users in a much larger area. This may be advantageous in certain use cases, such as in a group video conferencing application that utilizes a front facing camera of a device.

Figure 9:
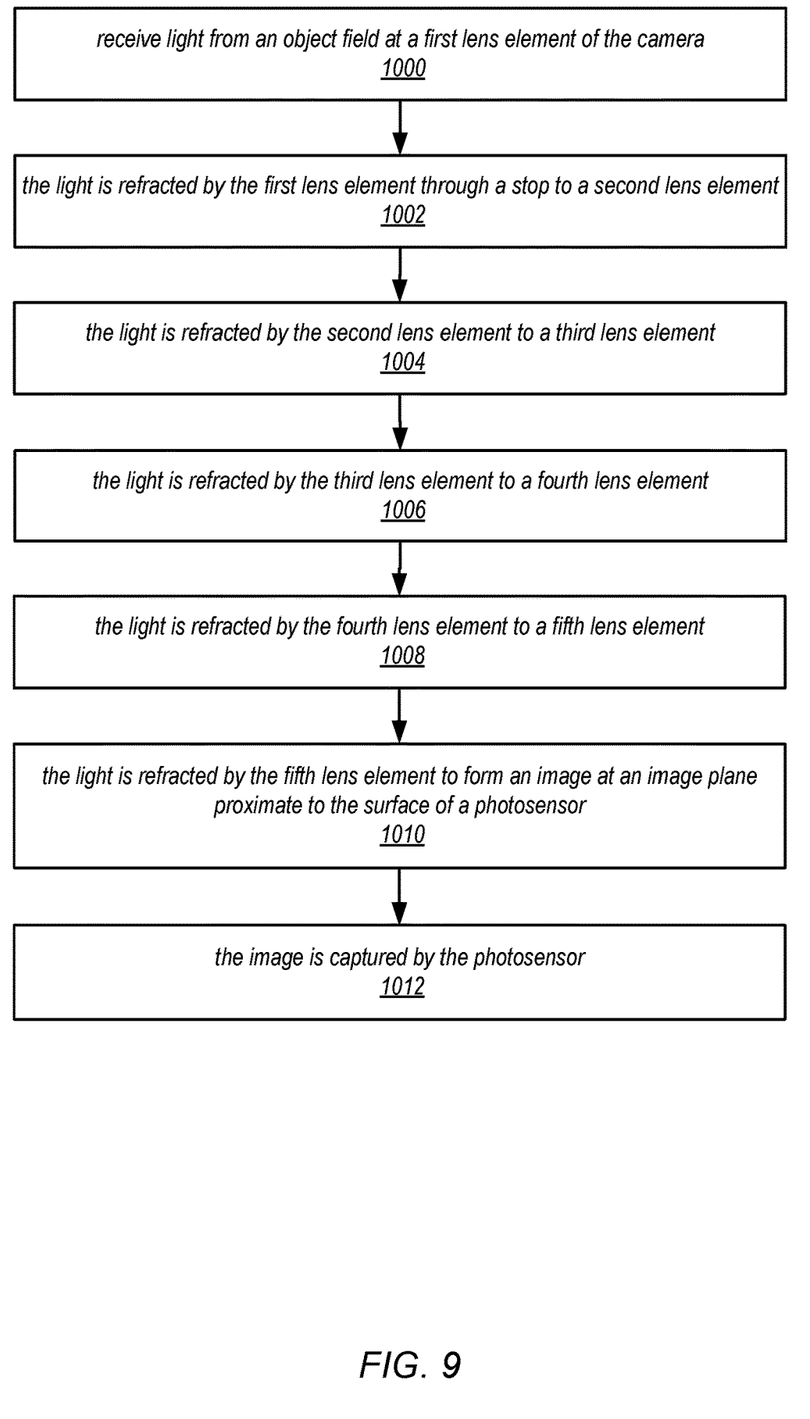
FIG. 9 is a flowchart of a method for capturing images using a camera as illustrated in FIGS. 1 through 5, according to some embodiments.

FIG. 9 is a high-level flowchart of a method for capturing images using a camera with a wide FOV lens system that includes five lens elements as illustrated in FIGS. 1 through 5, according to some embodiments. As indicated at 1000, light from an object field in front of the camera is received at a first lens element of the camera. As indicated at 1002, the first lens element refracts the light to a second lens element. In some embodiments, the first lens element may have negative refractive power and have an aspheric object side surface. As indicated at 1004, the light is then refracted by the second lens element to a third lens element. In some embodiments, the second lens element may have positive refractive power, have a convex object side surface in a paraxial region, and have a convex image side surface in the paraxial region. As indicated at 1006, the light is then refracted by the third lens element to a fourth lens element. In some embodiments, the third lens element may have negative refractive power having a concave image side surface in the paraxial region. As indicated at 1008, the light is then refracted by the fourth lens element to a fifth lens element. In some embodiments, the fourth lens element may have positive refractive power having a convex image side surface in the paraxial region. As indicated at 1010, the light is refracted by the fifth lens element to form an image at an image plane at or near the surface of a photosensor. In some embodiments, the fifth lens element may have a concave image side surface in the paraxial region and may have an aspheric image side surface with at least one region being convex from the paraxial region to peripheral regions. As indicated at 1012, the image is captured by the photosensor. While not shown, in some embodiments, the light may pass through an infrared filter that may for example be located between the fifth lens element and the photosensor.

Example Computing Device

FIG. 10 illustrates an example computing device, referred to as computer system 2000, that may include or host embodiments of the camera as illustrated in FIGS. 1 through 5. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 1 through 5, which may also be coupled to I/O interface 2030, or one or more wide FOV cameras as described above with respect to FIGS. 1 through 5 along with one or more other cameras such as conventional telephoto/other cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 10, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a photosensor configured to capture light projected onto a surface of the photosensor; and
a lens system configured to refract light from an object field located in front of the camera to form an image of a scene at an image plane at or near the surface of the photosensor, wherein the lens system comprises a plurality of refractive lens elements arranged along an optical axis of the camera, wherein the plurality of lens elements includes only five refractive lens elements, wherein the plurality of lens elements includes, in order along the optical axis from an object side of the lens system to an image side of the lens system:
a second lens element following a first lens element along the optical axis, wherein an object side surface of the second lens element has a radius of curvature R3, and wherein an image side surface of the second lens element has a radius of curvature R4, satisfying the following relationship:

$|R4/R3|<0.6;$ a third lens element, wherein an object side surface of the third lens element has a radius of curvature R5, and wherein the image side surface of the third lens element has a radius of curvature R6, satisfying the following relationship:

$|(R5+R6)/(R5-R6)|>1.5;$ and a fourth lens element having a convex object side surface in the paraxial region; and
wherein:
the lens system is configured to have a field-of-view (FOV) within a range of 110° to 140°, and wherein the lens system has an F-number within a range of 2.2 to 2.8;
the lens system has an effective focal length (EFL);
Dist_Error corresponds to a deviation from a perfect equi-distant distortion;
θ represents an angle-of-viewing as measured with respect to the optical axis and an object that is located along an object arc in the object field;
Yreal is a first value that is dependent on the angle-of-viewing, wherein Yreal(θ) is defined as a real image position at which a particular angle-of-viewing is imaged onto the photosensor;
Yref is a second value dependent on the angle-of-viewing and is defined as:

$Yref(\theta)=EFL*\theta;$ $Dist\_Error(\theta)=100\times[Yreal(\theta)-Yref(\theta)]/Yref(\theta),$ and

|Dist_Error(θ)| across the FOV is less than 8 percent.

2. The camera as recited in claim 1, wherein the lens system provides equi-distant distortion such that an angular object space resolution is substantially maintained across the entire FOV.

3. The camera as recited in claim 1, wherein the plurality of lens elements includes, in order along the optical axis from the object side of the lens system to the image side of the lens system:
the first lens element with negative refractive power having an aspheric object side surface;
the second lens element with positive refractive power having a convex object side surface in a paraxial region and having a convex image side surface in the paraxial region;
the third lens element with negative refractive power having a concave image side surface in the paraxial region;

the fourth lens element with positive refractive power having a convex image side surface in the paraxial region; and a fifth lens element having a concave image side surface in the paraxial region and having an aspheric image side surface with at least one region being convex from the paraxial region to peripheral regions.

4. The camera as recited in claim 3, wherein a focal length fsystem of the lens system and a first focal length f1 of the first lens element satisfy the following relationship:

−0.8<$f$system/$f1$<−0.2.

5. The camera as recited in claim 3, wherein a focal length fsystem of the lens system and a second focal length f2 of the second lens element satisfy the following relationship:

0.9<$f$system/$f2$<1.6.

6. The camera as recited in claim 3, wherein a focal length fsystem of the lens system and a third focal length f3 of the third lens element satisfy the following relationship:

|$f$system/$f3$|<0.7.

7. The camera as recited in claim 3, wherein a focal length fsystem of the lens system and a fourth focal length f4 of the fourth lens element satisfy the following relationship:

0.5<$f$system/$f4$<1.2.

8. The camera as recited in claim 3, wherein the object side surface of the fourth lens element has a radius of curvature R7, and wherein the image side surface of the fourth lens element has a radius of curvature R8, satisfying the following relationship:

|R8/R7|<0.54.

9. The camera as recited in claim 3, wherein an object side surface of the fifth lens element has a radius of curvature R9, and wherein the image side surface of the fifth lens element has a radius of curvature R10, satisfying the following relationship:

|(R9+R10)/(R9−R10)|>1.7.

10. The camera as recited in claim 3, wherein:
the first lens element has an Abbe number Vd1 that is greater than 50;
the second lens element has an Abbe number Vd2 that is greater than 50;
the third lens element has an Abbe number Vd3 that is less than 30;
the fourth lens element has an Abbe number Vd4 that is greater than 50; and
the fifth lens element has an Abbe number Vd5 that is less than 30.

11. The camera as recited in claim 3,
wherein ImagH is a maximum image height that the lens system is designed for projecting the image on the photosensor;
wherein TTLsystem is a distance from a vertex of the object side surface of the first lens element to the image plane;
wherein TTLlens is a distance from the vertex of the object side surface of the first lens element to a vertex of the image side surface of the fifth lens element;
wherein Z12 is a distance of the vertex of the image side surface of the first lens element to a vertex of the object side surface of the second lens element; and
wherein the following relationships are satisfied:

TTLsystem/(2*$ImagH$)<1.2;

0.75<TTLlens/TTLsystem<0.85;

0.1<Z12/TTLlens<0.2; and

TTLsystem<5 millimeters (mm).

12. A lens system, comprising:
a plurality of refractive lens elements arranged along an optical axis of the lens system, wherein the plurality of lens elements includes, in order along the optical axis from an object side to an image side:
a first lens element with negative refractive power having an aspheric object side surface;
a second lens element with positive refractive power having a convex object side surface in a paraxial region and having a convex image side surface in the paraxial region wherein an object side surface of the second lens element has a radius of curvature R3, and wherein an image side surface of the second lens element has a radius of curvature R4, satisfying the following relationship:

|R4/R3|<0.6;

a third lens element with negative refractive power having a concave image side surface in the paraxial region, wherein an object side surface of the third lens element has a radius of curvature R5, and wherein the image side surface of the third lens element has a radius of curvature R6, satisfying the following relationship:

|(R5+R6)/(R5−R6)|>1.5;

a fourth lens element with positive refractive power having a convex object side in the paraxial region and a convex image side surface in the paraxial region; and
a fifth lens element having a concave image side surface in the paraxial region and having an aspheric image side surface with at least one region being convex from the paraxial region to peripheral regions;
wherein:
the lens system has a field-of-view (FOV) that is greater than or equal to 110°;
the lens system has an effective focal length (EFL);
Dist_Error corresponds to a deviation from a perfect equi-distant distortion;
θ represents an angle-of-viewing as measured with respect to the optical axis and an object that is located along an object arc in an object field located in front of the lens system;
Yreal is a first value that is dependent on the angle-of-viewing, wherein Yreal(θ) is defined as a real image position at which a particular angle-of-viewing is imaged onto a photosensor;
Yref is a second value dependent on the angle-of-viewing and is defined as:

$Yref$(θ)=EFL*θ; and $Dist$_Error(θ)=100×[$Yreal$(θ)−$Yref$(θ)]/$Yref$(θ), and

Dist_Error(θ)| across the FOV is less than 8 percent.

13. The lens system as recited in claim 12, wherein the FOV is within a range of 110° to 140°, and wherein the lens system has an F-number within a range of 2.2 to 2.8.

14. The lens system as recited in claim 12, wherein both the image side surface and the object side surface of the fifth lens element have aspheric surface shapes.

15. The lens system as recited in claim 14, further comprising an aperture stop located between the first lens element and the second lens element.

16. The lens system as recited in claim 15,
wherein the object side surface of the first lens element has at least one region that is convex;
wherein the object side surface of the first lens element has an outermost vertex at which the object side surface of the first lens element becomes convex;
wherein a maximum SAG value along the object side surface of the first lens element has a height Yh1 measured from the optical axis to the outermost vertex;
wherein an effective focal length of the lens system is EFL;
wherein StopH is a half-height dimension of the aperture stop as measured from the optical axis to an edge of the aperture stop along a Y-axis that is defined by the optical axis and the outermost vertex;
wherein CT1 is a center thickness of the first lens element as measured along the optical axis from the object side of the first lens element to the image side of the first lens element; and
wherein the following relationships are satisfied:

$0.2 < Yh1/EFL < 0.5;$ $0.8 < Yh1/StopH < 1.4;$ and $1.5 < Yh1/CT1 < 4.$

17. A device, comprising:
one or more processors;
one or more cameras; and
a memory comprising program instructions executable by at least one of the one or more processors to control operations of the one or more cameras;
wherein at least one of the one or more cameras is a wide field-of-view (FOV) camera comprising:
a photosensor configured to capture light projected onto a surface of the photosensor; and
a lens system configured to refract light from an object field located in front of the camera to form an image of a scene at an image plane proximate to the surface of the photosensor, wherein the lens system comprises five refractive lens elements arranged along an optical axis of the camera;
wherein the plurality of lens elements includes only five lens elements, in order along the optical axis from an object side of the lens system to an image side of the lens system:
a second lens element following a first lens element along the optical axis, wherein an object side surface of the second lens element has a radius of curvature R3, and wherein an image side surface of the second lens element has a radius of curvature R4, satisfying the following relationship:

$|R4/R3| < 0.6;$ a third lens element, wherein an object side surface of the third lens element has a radius of curvature R5, and wherein the image side surface of the third lens element has a radius of curvature R6, satisfying the following relationship:

$|(R5+R6)/(R5-R6)| > 1.5;$ and a fourth lens element having a convex object side surface in the paraxial region; and
wherein:
the lens system has a field-of-view (FOV) within a range of 110° to 140°, and wherein the lens system has an F-number within a range of 2.2 to 2.8;
the lens system has an effective focal length (EFL);
Dist_Error corresponds to a deviation from a perfect equi-distant distortion;
θ represents an angle-of-viewing as measured with respect to the optical axis and an object that is located along an object arc in the object field;
Yreal is a first value that is dependent on the angle-of-viewing, wherein Yreal(θ) is defined as a real image position at which a particular angle-of-viewing is imaged onto the photosensor;
Yref is a second value dependent on the angle-of-viewing and is defined as:

$Yref(θ)=EFL*θ;$ and $Dist\_Error(θ)=100×[Yreal(θ)-Yref(θ)]/Yref(θ),$ and

|Dist_Error(θ)| across the FOV is less than 8 percent.

18. The device as recited in claim 17, wherein the lens elements include, in order along the optical axis from the object side to the image side:
the first lens element with negative refractive power having an aspheric object side surface;
the second lens element with positive refractive power having a convex object side surface in a paraxial region and having a convex image side surface in the paraxial region;
the third lens element with negative refractive power having a concave image side surface in the paraxial region;
the fourth lens element with positive refractive power having a convex image side surface in the paraxial region; and
a fifth lens element having a concave image side surface in the paraxial region and having an aspheric image side surface with at least one region being convex from the paraxial region to peripheral regions.

19. The lens system as recited in claim 14,
wherein the image side surface of the fifth lens element has an outermost vertex at which the image side surface of the fifth lens element becomes convex;
wherein a maximum SAG value along the image side surface of the fifth lens element has a height Yh5 measured from the optical axis to the outermost vertex;
wherein an effective focal length of the lens system is EFL; and
wherein the following relationship is satisfied:

$0.4 < Yh5/EFL < 0.7.$

* * * * *